(12) United States Patent
Zhou et al.

(10) Patent No.: US 8,345,688 B2
(45) Date of Patent: Jan. 1, 2013

(54) SYSTEM AND METHOD FOR MANAGING FLOW OF PACKETS

(75) Inventors: Junlan Zhou, Sunnyvale, CA (US); Zhengrong Ji, Sunnyvale, CA (US); Yuguang Wu, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 495 days.

(21) Appl. No.: 12/710,726

(22) Filed: Feb. 23, 2010

(65) Prior Publication Data
US 2011/0205931 A1 Aug. 25, 2011

(51) Int. Cl.
*H04L 12/28* (2006.01)
(52) U.S. Cl. ........................................ 370/392; 709/223
(58) Field of Classification Search ........................ None
See application file for complete search history.

(56) References Cited

U.S. PATENT DOCUMENTS

| | | | |
|---|---|---|---|
| 6,091,709 A | 7/2000 | Harrison et al. | |
| 7,509,674 B2 * | 3/2009 | Sterne | 726/13 |
| 7,680,822 B1 * | 3/2010 | Vyas et al. | 707/781 |
| 2003/0152029 A1 | 8/2003 | Couturier | |
| 2004/0208178 A1 | 10/2004 | Tuck et al. | |

FOREIGN PATENT DOCUMENTS
WO 03/012672 A2 2/2003

OTHER PUBLICATIONS
Inrternational Search Report and Written Opinion, PCT/US2011/025709, dated Nov. 11, 2011.

* cited by examiner

*Primary Examiner* — Kevin C Harper
(74) *Attorney, Agent, or Firm* — Lerner, David, Littenberg, Krumholz & Mentlik, LLP

(57) ABSTRACT

A method for managing flow of packets comprises inputting a plurality of flow rules of various priorities to a router having a plurality of hardware resources, the plurality of hardware resources having varying levels of capability relative to each other. A first rule, for example a rule having a lowest priority, may be selected from among the plurality of flow rules, and it may be determined whether the first rule conflicts with any lower priority rules stored in the hardware resource with a highest capability. If the first rule conflicts with a lower priority rule in the hardware resource with the highest capability, the first rule may be stored in the resource with the highest capability. If the first rule does not conflict with a lower priority rule in the hardware resource with the highest capability, the first rule may be processed to identify the hardware resource with a lowest capability that can support the first rule, and the first rule may be stored in the identified resource.

21 Claims, 4 Drawing Sheets

SYSTEM AND METHOD FOR MANAGING FLOW OF PACKETS

BACKGROUND OF THE INVENTION

Enterprise or data center networks are often large, and run a wide variety of applications and protocols. Forwarding behaviors of packets on a router in such networks are governed by policies, generated by routing protocols, such as BGP, ISIS, OSPF, or network manager. Each policy is described as a flow rule, which comprises a flow identifier, an action, and a priority.

The flow identifier defines the set of packets the policy is applied to, and consists of a set of tuples. Each tuple corresponds to a header field (e.g. source IP, destination IP, source port, destination port and etc), and has a value and mask to support wild-card matching. For instance, a policy generated by BGP has (destination_ip, mask) as the flow identifier.

The action specifies the forwarding behaviors (e.g. egress port, destination MAC, class of service, counter action) of packets to be implemented by the router if the packet matches the flow identifier. When a packet qualifies for multiple flow rules, its forwarding behavior is dictated by the rule with highest priority.

Routers often provide multiple hardware tables for implementing flow rules, such as a Media Access Control (MAC) table, LPM, an MPLS table, and an ACL table. The hardware tables may vary in size from one router to the next. The ACL table is often a more expensive hardware resource on the router, because it can classify traffic using much wider flow identifiers (200~300 bits in the packet header) than MAC/LPM/MPLS tables (20~48 bits in the packet header). Additionally, because of its capabilities, the ACL table is most often used to store flow rules for forwarding packets. Accordingly, a system and method for more efficiently managing the flow of packets on a router is desired.

SUMMARY OF THE INVENTION

One aspect of the present invention provides a method for managing flow of packets, comprising inputting a plurality of flow rules of various priorities to a router having a plurality of hardware resources, the plurality of hardware resources having varying levels of capability relative to each other. For example, one resource may have increased packet identification capabilities relative to another resource. A first rule, for example a rule having a lowest priority, may be selected from among the plurality of flow rules, and it may be determined whether the first rule conflicts with any lower priority rules stored in the hardware resource with a highest capability. If the first rule conflicts with a lower priority rule in the hardware resource with the highest capability, the first rule may be stored in the resource with the highest capability. If the first rule does not conflict with a lower priority rule in the hardware resource with the highest capability, the first rule may be processed to identify the hardware resource with a lowest capability that can support the first rule, and the first rule may be stored in the identified resource. Further, it may be determined whether any rules stored in at least one resource of the plurality of hardware resources are unnecessary, and such unnecessary rules may be removed from the at least one resource. A rule may be determined to be unnecessary if it is a subset of another rule and has a lower priority than that other rule.

Additionally or alternatively, it may be determined whether the first rule conflicts with any other lower priority rules implemented on the router, and if not, the priority of the first rule may be decreased. Similarly, it may be determined whether the first rule conflicts with any other higher priority rules implemented on the router, and if not the priority of the first rule may be increased.

Another aspect of the invention provides a method for managing flow of packets, comprising adding a flow rule to a router having a plurality of hardware resources storing flow rules of various priorities, the plurality of hardware resources having varying levels of capability relative to each other. The added rule may be processed to identify a lowest capability hardware resource in which the added rule can be stored, and the added rule may be stored in the identified resource. If the added rule is stored in a highest capability resource, any higher priority rules may be moved from a lower capability resource into the highest capability resource if such higher priority rules overlap with the added rule. Further, it may be determined whether the added rule is a subset of another higher priority rule on the router, and if so, the rule may be added to a deprecated rule set. Even further, it may be determined whether any rules stored in the highest capability resource are redundant, and any redundant rules may be removed from the resource and added to the deprecated rule set.

Yet another aspect of the invention provides a method for managing flow of packets, comprising selecting a flow rule for deletion from a router having a plurality of hardware resources storing flow rules of various priorities, the plurality of hardware resources having varying levels of capability relative to each other. The hardware resource in which the selected rule is stored may be identified, and the selected rule may be removed from the identified hardware resource. If the selected rule is removed from a highest capability resource, additional rules may be moved from the highest capability resource to a lower capability resource if such rules can be supported by the lower capability resource and do not conflict with any rules of the same priority in the lower capability resource.

Another aspect of the invention provides a system for managing flow of packets in a router, comprising an input capable of receiving packet flow rules of various priorities, a plurality of hardware resources having varying levels of capability relative to each other, and a processor programmed to implement flow rules received at the input into the plurality of hardware resources. The processor may implement the flow rules by selecting a first rule having a lowest priority, determining whether the first rule conflicts with any lower priority rules stored in the resource with a highest capability, storing the first rule in the resource with the highest capability if the first rule conflicts with a lower priority rule in the resource with the highest capability, and processing the first rule to identify the hardware resource with the lowest capability that can support the first rule if the first rule does not conflict with a lower priority rule in the resource with the highest capability, and storing the first rule in the identified resource. The hardware resources may be a MAC table, an MPLS table, and LPM table and an ACL table, wherein the ACL table is the highest capability resource. The varying levels of capability of the plurality of resources may be packet identification capabilities.

DETAILED DESCRIPTION

According to an aspect of the invention, a flow manager mechanism implements flow rules using the least amount of hardware resources (e.g., ACL, LPM, MPLS, and MAC table entries). For example, a set of rules may be processed in relation to one another by the flow manager to produce the result of a smaller but equivalent set of rules. Additionally, the flow manager may adjust priorities of flow rules in relation to one another and may determine in which hardware resource each flow rule should reside to minimize usage of more expensive resources (e.g., the ACL table).

Figure 1:
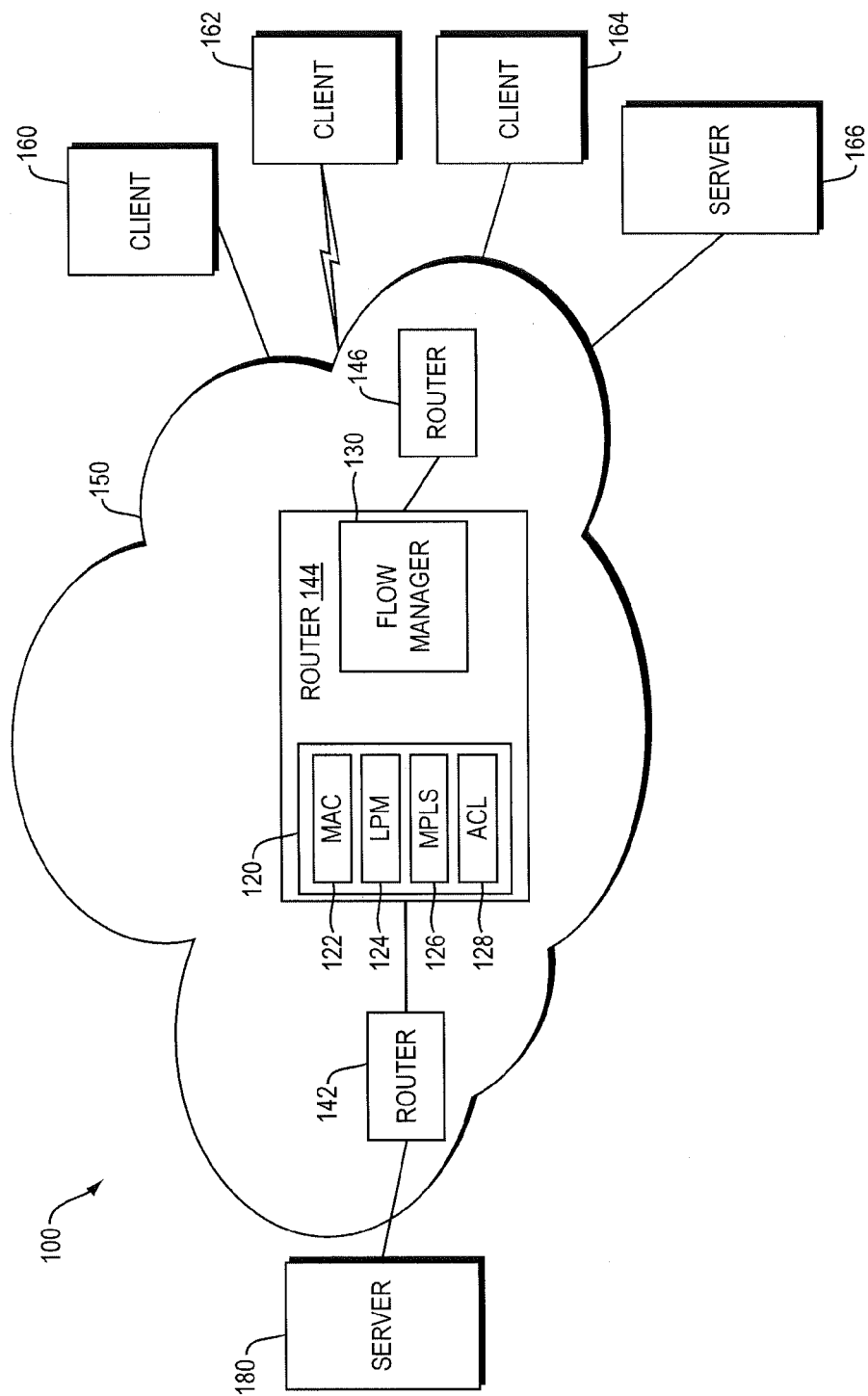
FIG. 1 is a system diagram according to an aspect of the invention.

FIG. 1 shows a system 100 including a server 180 connected to clients 160-164 and server 166 through a network 150. The network 150 includes a number of routers 142, 144, 146. The router 144 includes memory 120 including a number of resources, such as packet forwarding tables. According to one aspect, these packet forwarding tables may include media access control (MAC) table 122, longest prefix match (LPM) table 124, multi protocol label switching (MPLS) table 126, and access control list (ACL) table 128. Of these resources, some may be more costly than others. One possible reason may be that some resources have higher capabilities (e.g., can control traffic based on a wider variety of identifiers, such as source IP, source port, destination IP, destination port, etc.). For example, the ACL table 128 may have the highest capability, and thus be the most expensive resource, because it is capable of storing a wider variety of packet routing rules than the Mac table 122, the LPM table 124, or the MPLS table 126. Accordingly, resources in the memory 120 may be managed by flow manager 130 to use the resources most efficiently.

The MAC table 122 may have a lookup key (e.g., denoted as mac_lookup_key) for retrieving actions stored in corresponding MAC table entries (e.g., denoted as mac_action). The lookup key may also correspond to an identification of an ingressing packet. For example, the lookup key for the MAC table 122 may be {VID, DA}, wherein VID is the Virtual Local Area Network (VLAN) identifier and DA is the destination MAC address. Accordingly, when {VID, DA} of an ingressing packet matches the key of a MAC table entry, the corresponding mac_action is assigned to the packet. The action is often equal to {egress_port}, and specifies to which egress_port in the router the packet should be forwarded. On some router hardware, a counter is available to track the number of packets matching a particular MAC table entry. In this instance, mac_action takes the form {egress_port, inc_counter}.

Similar to the MAC table 122, the LPM table 124 in an ipv4/ipv6 network may also have a lookup key, denoted as lpm_lookup_key. This lookup key may take the form {VRF_id, DIP}, wherein DIP is the destination Internet Protocol address. Each LPM table entry specifies an action, denoted as lpm_action, which may take the form {egress_port} or {egress_port, inc_counter}.

The MPLS table 126 may also have a lookup key, denoted as mpls_lookup_key, in the form {VRF_id, ingress_port, mpls_label}. The mpls_label field of an MPLS packet identifies the destination of packet, similar to a destination IP address. Each MPLS table entry specifies an action denoted as mpls_action to be applied to the port, which may be {egress_port, command} or {egress_port, command, inc_counter}. The command may be push/pop/swap.

The ACL table 128 may have a lookup key denoted as acl_lookup_key. This may take the form of any of a number of routing schemes, such as src_ip/mask, destination_ip/mask, src_port/mask, dest_port/mask, src_mac/mask, dest_mac/mask, etc. The action specified by the ACL table entry is denoted as acl_action, which may include egress_port, change_cos, inc_counter, etc. The change_cos field changes the class of service of packets.

A packet ingressing the router 144 goes through a packet processing pipeline, where first L2 processing is performed, then L3 processing, and then ACL processing. During L2 processing, the packet will be matched against the MAC table 122. If mac_action.egress_port is a physical port on the router or drop instead of l3_router, the packet skips L3 processing (during which the packet is matched against the MPLS table 126 or the LPM table 124) and is then matched against the ACL table 128. Otherwise, the packet is matched against the LPM table 124 or the MPLS table 126, depending on the packet type. After L2/L3 processing, the packet is matched against the ACL table 128. If it matches an ACL table entry, the corresponding acl_action assigns the ultimate outgoing port from which the packet is forwarded to egress from the router 144 onto the next router 146 or the destination host (e.g., client 162). For example, the packet may be assigned acl_action.egress_port. This may override any egress port (e.g., mac_action.egress_port, lpm_action.egress_port, or mpls_action.egress_port) previously assigned as a result of L2/L3 processing.

The flow manager 130 may determine how to efficiently utilize hardware resources based on a set of principles. These principles consider two rules, hereinafter denoted as Rule A and Rule B for convenience, in relation to one another. One relationship may be that Rule A and Rule B conflict with each other, which may occur if a packet received at the router 144 would match both rules. For example, the flow identifiers for Rule A and Rule B may not overlap, but may match different fields in the packet header (e.g., A.flow_identifier={src_mac=01:00:00:00:00:00} and B.flow_identifier={dest_mac=01:00:00:00:00:00}). Alternatively, for example, the flow identifiers for Rule A and Rule B may overlap, and the common header fields may have overlapping value ranges (e.g., A.flow_identifier={src_mac=01:xx:xx:00:00:00} and B.flow_identifier={dest_mac=01:11:11:xx:xx:xx}). Another potential relationship between Rule A and Rule B is that one rule is a subset of another. For example, Rule A may be a subset of Rule B if packets matching A are a subset of those matching B.

According to a first principle, Rule B must be implemented in the ACL table 128 if Rule A having lower priority is implemented in the ACL table 128 and Rule A conflicts with Rule B. For example, assume Rule B is not stored in ACL table 128. Since Rule A conflicts with Rule B, a packet p may match both Rule A and Rule B. As p goes through the packet processing pipeline, it is first matched with Rule B, for example during L2 processing, and assigned with B.action. As the packet p continues through the processing pipeline, it is then matched with lower priority Rule A, for example during ACL processing, and assigned with A.action. Accordingly, the forwarding action of p would be A.action, which would violate the definition of priority of policies. However, storing higher priority Rule B in the ACL table 128 would cause the packet p to end up with a forwarding action of B.action, and thus adhere to the defined priorities.

According to a second principle, if Rule B is a subset of Rule A and Rule B has lower priority than Rule A, B is redundant and may be eliminated. For example, if Rule B is a subset of Rule A, a packet p matching Rule B would also match Rule A. Because Rule A has a higher priority than B, the forwarding behavior of p is dictated by Rule A. Therefore, Rule B can be eliminated without affecting forwarding behaviors of packets.

According to a third principle, if a Rule A does not conflict with any other lower priority rules implemented on the router, the priority of Rule A may be decreased without affecting the forwarding behaviors of packets. For example, let S be the original rule set implemented on the router, and S' be the new rule set with all rules in S and A assigned to a lower priority. For a packet p, $R_p$ and $R_p'$ denotes the rule dictating p's forwarding action if S or S' is implemented on the router respectively. If $R_p$=A, A is the highest priority rule matching p. Since A does not conflict with any lower priority rules in S, p does not match with any rules of lower priorities than A in S. If A's priority is decreased, p still matches A, and therefore $R_p'$=A. Accordingly, $R_p$=$R_p'$. If $R_p$=B and B≠A, there are two possible cases: (1) p matches both B and A, B and has a higher priority (2) p doesn't match A. In either case, $R_p'$=B with A's priority lowered.

According to a fourth principle, if a Rule A does not conflict with any other higher priority rules implemented on the router, the priority of Rule A may be increased without affecting the forwarding behaviors of packets. Let S be the original rule set implemented on the router, and S' be the new rule set with all rules in S and A assigned to a higher priority. For a packet p, $R_p$ and $R_p'$ denotes the rule dictating p's forwarding action if S or S' is implemented on the router respectively. If $R_p$=A, A is the highest priority rule matching p. Since A does not conflict with any higher priority rules in S, p does not match with any rules of higher priorities than A in S. If A's priority is increased, p is still assigned with A.action, and therefore $R_p'$=A. Accordingly, $R_p$=$R_p'$. If $R_p$=B and B≠A, p doesn't match A, and $R_p'$=B with A's priority increased.

The flow manager 130 may implement flow rules generated by routing protocols or network operators based on the foregoing principles in order to minimize usage of hardware table resources on the router. According to one aspect, the flow manager 130 may manage resources during at least three events: initialization, adding a rule, and removing a rule. During initialization, the flow manager 130 receives a set of initial flow rules, and determines how to implement these rules in the MAC table 122, the LPM table 124, the MPLS table 126, and the ACL table 128. During its run-time, the flow manager 130 processes commands to add/remove a flow rule, by adding/removing rules in the MAC table 122, LPM table 124, MPLS table 126, and ACL table 128. Each of these events will be described in detail below.

The flow manager 130 may be a software module stored on a network router (e.g., router 144). Alternatively, the flow manager 130 may be stored on a separate piece of hardware connected to the router. In this regard, the flow manager may include its own processor, or may share a processor with the router. Similarly, according to one aspect, the flow manager 130 may be connected to and may manage the rule sets of a plurality of routers (e.g., routers 142-146).

Figure 2:
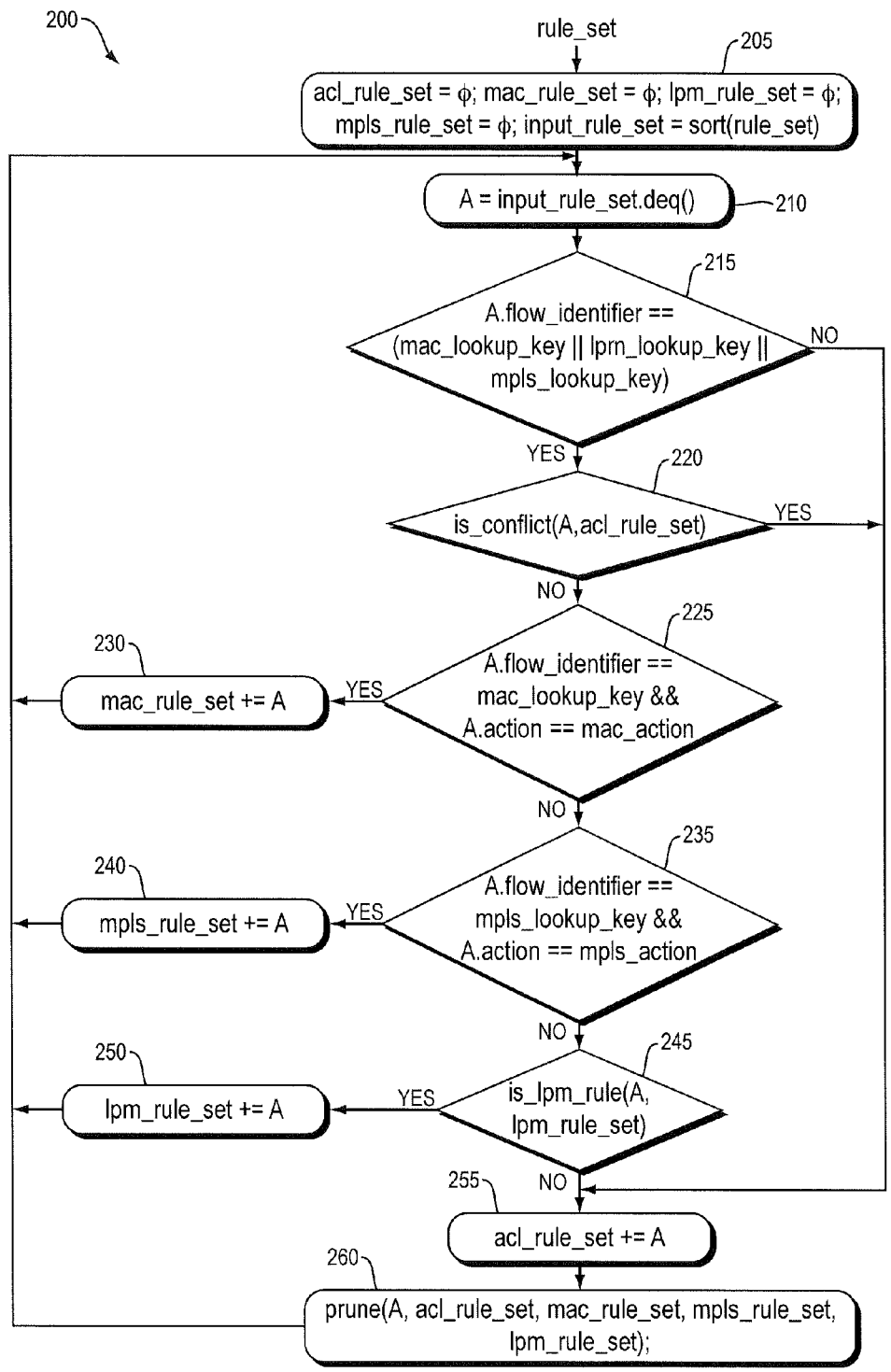
FIG. 2 is a flow diagram according to an aspect of the invention.

FIG. 2 illustrates an initialization event of the flow manager 130. The initial input to the flow manager is a set of flow rules, denoted as rule_set. Based on this input, the flow manager 130 calculates mac_rule_set, lpm_rule_set, mpls_rule_set, and acl_rule_set, denoting the rules to be added to the MAC, LPM, MPLS and ACL tables 122-128. It also maintains a set of rules eliminated because they were determined to be redundant according to the second principle described above. This set of rules is denoted as deprecated_rule_set.

In step 205, the flow manager 130 may run one or more functions to organize a set of rules. For example, the flow manager 130 may run a sort(rule_set), which sorts the rules in rule_set in increasing priority. The priority may be based on any predefined criteria.

In step 210, the flow manager 130 selects one rule, for example Rule A, for processing. Because the rules were sorted by priority in step 205, Rule A may have highest or lowest priority. For purposes of this example, we assume that Rule A was selected first because it has a lowest priority.

Once selected, in step 215 the flow manager 130 determines whether the flow identifier of Rule A may be supported by a less expensive resource. For example, the flow manager 130 determines which, if any, of the MAC, LPM, or MPLS tables 122-126 can support a flow of packets matching Rule A. If the flow identifier of Rule A cannot be supported by any of the MAC, LPM, or MPLS tables 122-126, Rule A must be stored in the ACL table 128, which is the most expensive table on the router. Accordingly, the method 200 skips to step 255.

However, if it is determined in step 215 that the Rule A can be supported by one of the MAC, LPM, or MPLS tables 122-126, the method 200 proceeds to step 220 where it is determined if the Rule A conflicts with any lower priority rule in the ACL table 128. For example, is_conflict(A, acl_rule_set) determines if Rule A conflicts with a lower priority rule in acl_rule_set. In the event that there is such a conflict, Rule A must be stored in the ACL table 128 also, and so the method skips to step 255. If there is no such conflict, the method 200 proceeds to step 225.

In steps 225-245, a "sanity check" is performed. This sanity check determines whether the action of Rule A can be supported by the MAC, MPLS and LPM tables 122-126, respectively. While this check may have been performed during step 215 while determining which table could support the flow identifier of Rule A, performing this check later provides assurance that the Rule is placed in the least expensive resource which can support it. Performing this check later may also increase the processing time for performing the method 200.

In step 225, it is determined whether the action of Rule A may be supported by the MAC table 122. The MAC table 122 may be checked first, because it is the least expensive resource. If the MAC table 122 can support Rule A, Rule A may be stored in the MAC table 122 in step 230, and the process will return to step 210 to select another rule for placement. However, if it is determined that the MAC table 122 cannot support the action of Rule A, the method 200 continues to check the remaining resources.

In step 235, it is determined whether the action of Rule A may be supported by the next least expensive resource, here the MPLS table 124. If the action of Rule A can be supported, Rule A is added to the MPLS table 124 in step 240. However, if it cannot be supported, the LPM table is checked in step 245.

In step 255, is_lpm_rule(A, lpm_rule_set) returns true if A.flow_identifier is equal to lpm_lookup_key and A.action is equal to lpm_action. It further removes any rule in lpm_rule_set which is a subset of A and has a lower priority than A, and saves them into deprecated_rule_set. According to the second principle described above, such rules can be deprecated. Nevertheless, if Rule A is removed, they have to be added back to acl_rule_set, mac_rule_set, lpm_rule_set or mpls_rule_set. If the LPM table 126 can support the action of Rule A, Rule A is added to the LPM table 126 in step 250. Otherwise, Rule A must be added to the last remaining table and the most expensive resource, the ACL table 128, in step 255.

After a rule is added to the ACL table 128, additional steps may be performed to reduce the number of rules stored in the ACL table 128. For example, prune(A, acl_rule_set, mac_rule_set, lpm_rule_set, mpls_rule_set) removes any rule in acl_rule_set, mac_rule_set, lpm_rule_set, mpls_rule_set which is a subset of A and has a lower priority than A, and saves them into deprecated_rule_set.

Figure 3:
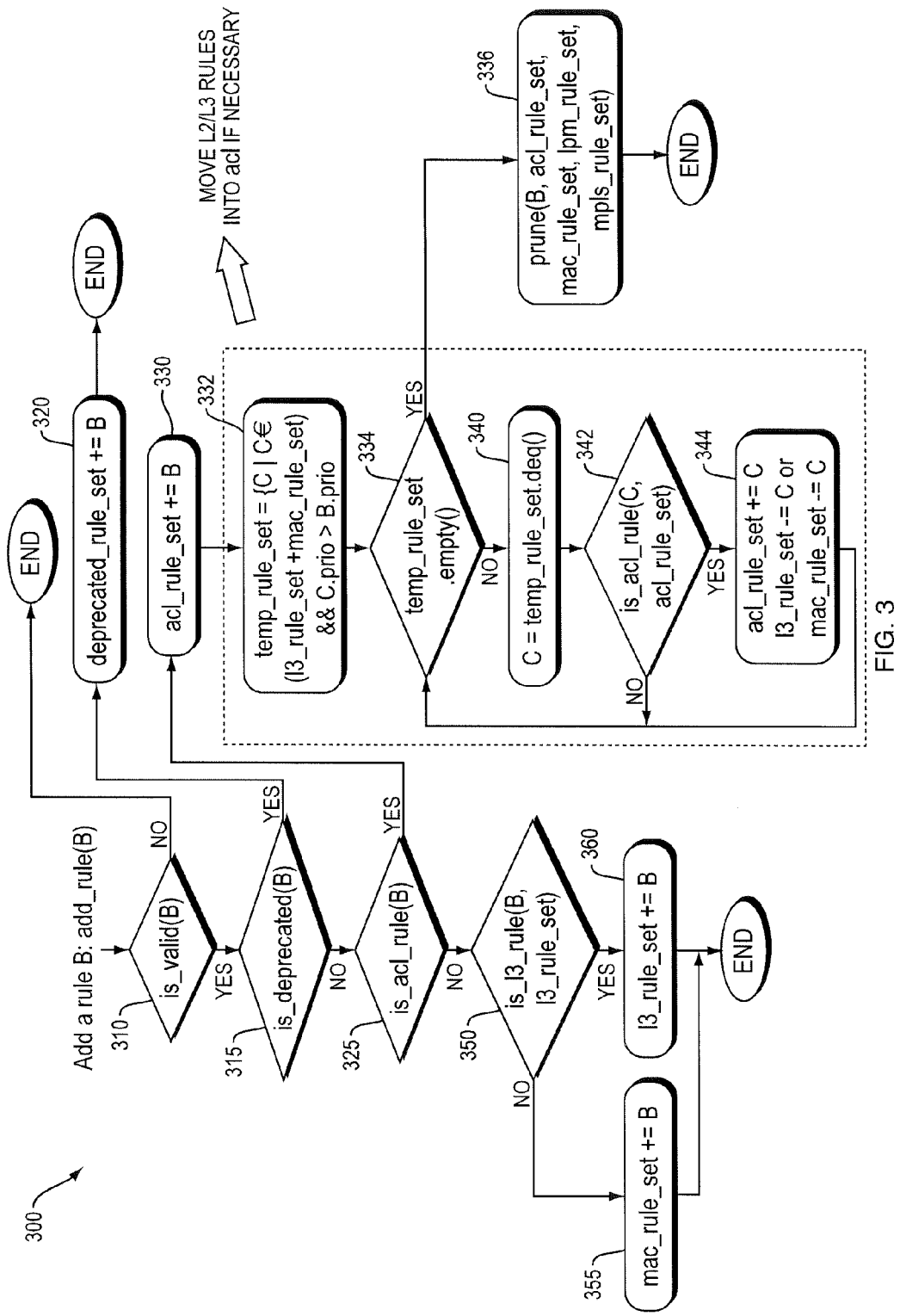
FIG. 3 is a flow diagram according to another aspect of the invention.

FIG. 3 illustrates a method 300 for adding a rule using the flow manager 130. For example, a Rule B that was not initialized in step 205 may be added. According to this method 300, the flow manager 130 will perform a series of additional steps to determine whether and how to store Rule B.

In step 310, it is determined whether the added Rule B is valid. For example, a rule may be valid only if it does not conflict with any other rule of the same priority. Accordingly, the flow manager may perform the function is_valid(A, l2_rule_set, l3_rule_set, mpls_rule_set, acl_rule_set). The l2_rule_set includes mac_rule_set. The l3_rule_set is the union of lpm_rule_set and mpls_rule_set. Accordingly, this function will return false if the added Rule B overlaps with any rule of the same priority in l2_rule_set, l3_rule_set, and acl_rule_set, in which case the method 300 ends and the rule is not added. However, if there is no such conflict, the function will return true and the process will proceed to step 315.

In step 315, it is determined whether the added Rule B is needed, or whether it would be redundant. For example, a function is_deprecated(B) may be performed. This function returns true if Rule B is a subset of another higher priority rule in l2_rule_set, l3_rule_set, or acl_rule_set. In that case, the Rule B may be considered redundant, and moved into the deprecated rule set in step 320. However, if the function is_deprecated(B) returns false, and it is determined that the Rule B is needed, the method 300 proceeds to step 325.

In step 325, it is determined if the Rule B must be stored in the ACL table 128. For example, it may be necessary to store Rule B in the ACL table 128 if its flow identifier or action is not supported by the MAC, LPM, or MPLS table 122-126. It may also be necessary to store Rule B in the ACL table 128 if it conflicts with any rules of lower priority already stored in the ACL table 128 (i.e., acl_rule_set). Accordingly, a function is_acl_rule(B, acl_rule_set) may be performed to determine whether either of these circumstances are present. If so, the function will return true, and the added Rule B will be stored in the ACL table 128 in step 330.

If it is determined in step 325 that Rule B does not need to be stored in the ACL table 128, the method 300 proceeds to steps 350-360, where the most appropriate storage table for Rule B is determined. For example, in step 350, it is determined whether it is necessary to store the Rule B in either of the L3 processing tables (LPM table 124 or MPLS table 126). Similar to the determination in step 325, this determination may be made by performing a function is_l3_rule(B, l3_rule_set), which returns true if Rule B's flow identifier or action is not supported by the MAC table 122, or if Rule B conflicts with any rules of lower priority in the LPM or MPLS tables 124, 126. If this function returns true, Rule B is stored in the L3 rule set (step 360), and thus is included in either the LPM table 124 or the MPLS table 126. However, if the function is_l3_rule(B, l3_rule_set) returns false, thus indicating that Rule B need not be stored in one of the L3 processing tables 124-126, Rule B is stored in the MAC table 122 in step 355.

If Rule B is moved into the ACL table 128 in step 330, another set of processing steps 332-344 is performed to determine whether any rules from the MAC, LPM, or MPLS tables 122-126 must be moved into the ACL table 128 also.

In step 332, a temporary rule set is defined as all the rules in the MAC, LPM, and MPLS tables 122-126 having higher priority than Rule B. In some circumstances, there may be no rules that fit such a definition. Accordingly, in step 334 it is determined whether any rules are present in the temporary rule set. For example, the function temp_rule_set.empty( ) may return true if there are no rules in the MAC or L3 rule sets with higher priority than Rule B, and false if at least one such rule exists. If the function returns true, signifying that no rules exist in the temporary rule set, the method 300 proceeds to step 336 to determine if any rules in any of the tables may be considered redundant and moved into a deprecated rule set before ending. If the function returns false, the method 300 proceeds to step 340.

In step 340 a Rule C from the temporary rule set is selected for analysis. In step 342, it is determined whether Rule C is an ACL rule and must be stored in the ACL table 128. For example, the function is_acl_rule(C,acl_rule_set) may return true if Rule C cannot be supported by any of the MAC, LPM, or MPLS tables 122-126, or if Rule C overlaps with a lower priority rule in the ACL rule set. In this case, the Rule C may be removed from the MAC or L3 rule set in step 344 and added to the ACL table 128. However, if it is determined in step 342 that Rule C is not an ACL rule, the process returns to step 334 to determine if there are any other rules in the set for analysis.

Figure 4:
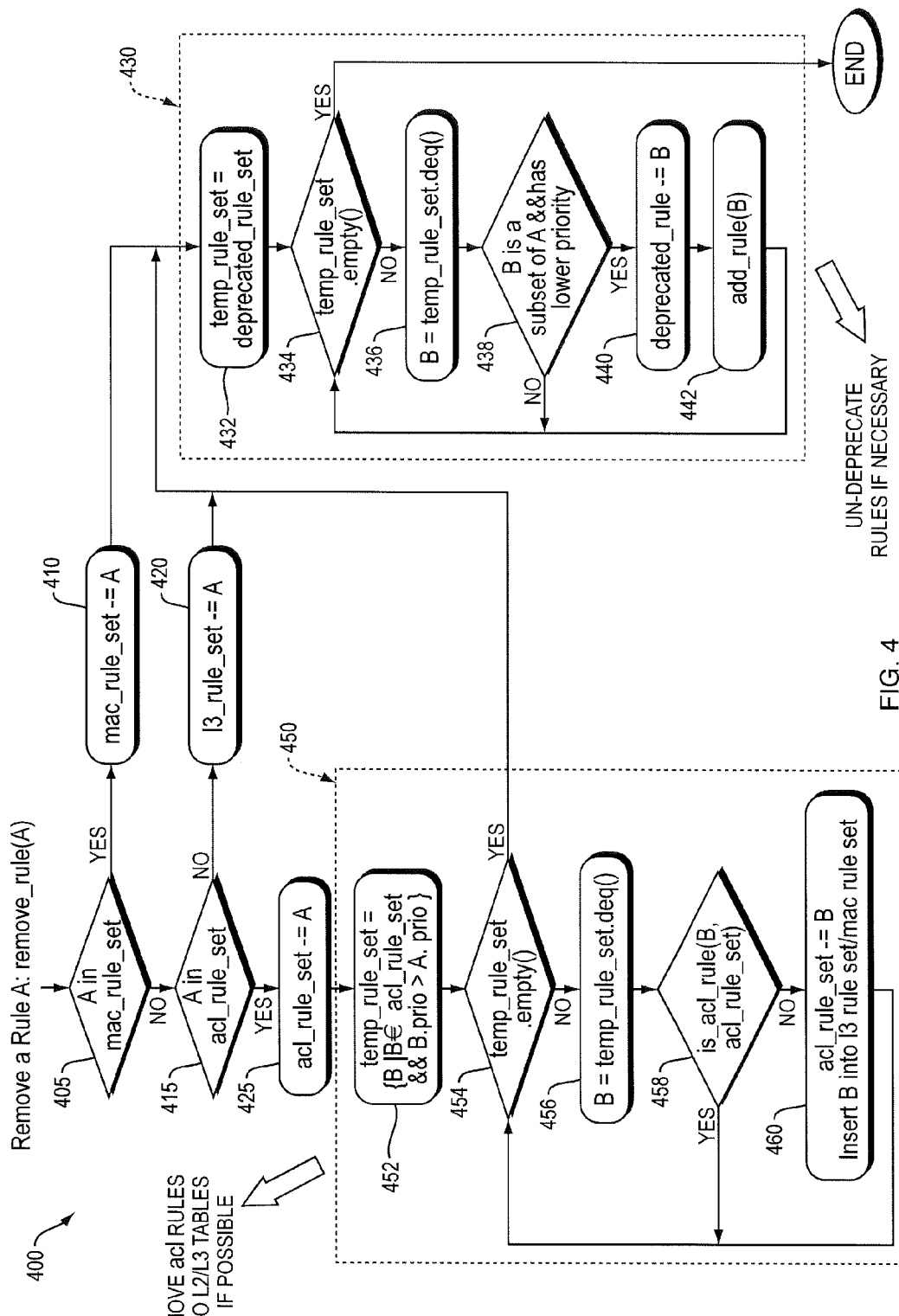
FIG. 4 is a flow diagram according to another aspect of the invention.

FIG. 4 illustrates a method 400 for removing a Rule A using the flow manager 130. For example, network topology changes could trigger re-computation of routing protocols, as a result of which flow rules could be removed. Accordingly, the flow manager 130 may perform a series of checks to ensure that removing the Rule A will not affect forwarding behaviors of packets not matching Rule A. For example, the flow manager 130 may determine that rules previously deprecated in step 336 during the addition of Rule A should now be added into ACL, MPLS, LPM, or MAC tables 122-128.

In steps 405-425 it is determined in which table the Rule A to be removed is currently stored. Specifically, in step 405, a check of MAC table 122 is performed to determine whether the Rule A is stored therein. If so, the Rule A is removed from the rule set stored in the MAC table 122 in step 410. If not, the method 400 proceeds to step 415.

In step 415, the ACL table 128 is checked for Rule A. If it is determined that the Rule A is present in the ACL table 128, it is removed from the table in step 425. However, if Rule A is not in the ACL table 128, it must be in one of the L3 processing tables (i.e., LPM table 124 or MPLS table 126). Accordingly, the Rule A is removed from the L3 rule set in step 420.

Once the Rule A has been removed, a further series of processing steps may be performed depending on which table the Rule A was removed from. If the Rule A was removed from the MAC rule set or the L3 rule set, a series 430 of steps may be performed to determine whether any rules from the deprecated rule set must be restored into the MAC, LPM, or MPLS table 122-126. If Rule A was removed from the ACL rule set, a series 450 of steps may be performed to determine if any other rules in the ACL table 128 may be moved into one of the MAC, LPM, or MPLS tables 122-126.

In step 432 of the series 430, a temporary rules set is defined as the deprecated rule set (e.g., the rules that were removed as redundant according to the second principle described above). In step 434, it is determined whether there are any rules in the deprecated rule set. For example, the function temp_rule_set.empty( ) may return true if there are no rules in the deprecated set, and false if at least one rule is present. For example, there may be no rules and the function would return true if none of the rules initialized in the method 200 were considered redundant in the pruning step 260. In this case, the method 400 for removing a rule may be ended.

However, if the function returns false indicating that at least one rule is present in the deprecated set, the series 430 continues to step 436.

In step 436, a first Rule B from the deprecated rule set is selected for analysis. In step 438, deprecated Rule B is compared to the removed Rule A to determine whether Rule B is a lower priority subset of Rule A. If it is not, Rule B may remain in the deprecated rule set, and the series 430 returns to step 434 to determine if there are any other rules in the deprecated rule set for analysis. If Rule B is determined to be a lower priority subset of Rule A in step 438, Rule B may be removed from the deprecated rule set in step 440 and added back to one of the tables (e.g., in accordance with method 300) in step 442.

Now turning to the series 450, in step 452 the temporary rules set includes all rules in ACL table that have higher priority than rule A. The temporary rule set is further sorted in increasing priority, and the rules within it are analyzed individually starting with a lowest priority rule to determine if they can be moved to the MAC, LPM or MPLS tables 122-126. For example, a rule in the temporary rule set can be moved from ACL table 128 to one of the MAC, LPM or MPLS tables 122-126 if it no longer overlaps with any lower priority rules in ACL table 128.

In step 454, it is determined whether the temporary rule set is empty. If so, the method 400 returns to the series 430 to find any rules in the deprecated rule set that must be restored. If not, however, the series 450 proceeds to step 456, where a Rule B is selected from the temporary rule set.

In step 458, it is determined whether Rule B must be stored in the ACL table 128. For example, it may be determined whether Rule B can be supported by the MAC, LPM, or MPLS tables 122-126. Alternatively or additionally, it may be determined whether Rule B overlaps with any rules of lower priority in the ACL rule set. If Rule B cannot be supported by another table, or if Rule B still conflicts with another lower priority rule in the ACL rule set, Rule B may be considered an ACL rule, and thus may remain in the ACL table 128. Accordingly, the series 450 returns to step 454 to determine if there are any other rules to analyze. However, if this is not the case, Rule B may be removed from the ACL rule set in step 460 and inserted into either the MAC rule set or the L3 rule set.

The above-described flow manager system and methods for initializing, adding, and removing rules in the hardware resources of a router is beneficial in that it minimizes usage of more expensive hardware resources, such as the ACL table 128, which promoting usage of less expensive resources such as the MAC table 122. In this regard, storage and processing capabilities of routers may be increased. In turn, networks may be capable of handling increased transmissions and overall transmission time may be reduced. Additionally, the cost of implementing networks may be reduced because the resources will be used most efficiently.

Although the present invention has been described with reference to particular embodiments, it should be understood that these examples are merely illustrative of the principles and applications of the present invention. For example, the present invention may be used to efficiently implement rules generated according to any of a number of routing protocols, such as BGP, ISIS, OSPF, network manager, etc. Moreover, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative embodiments and that other arrangements may be devised without departing from the spirit and scope of the present invention as defined by the appended claims.

The invention claimed is:

1. A method for managing flow of packets, comprising:
   inputting a plurality of flow rules of various priorities to a router having a plurality of hardware resources, the plurality of hardware resources having varying levels of capability relative to each other;
   selecting a first rule having a lowest priority from among the plurality of flow rules;
   determining whether the first rule conflicts with any lower priority rules stored in the hardware resource with a highest capability;
   storing the first rule in the resource with the highest capability if the first rule conflicts with a lower priority rule in the hardware resource with the highest capability; and
   processing the first rule to identify the hardware resource with a lowest capability that can support the first rule if the first rule does not conflict with a lower priority rule in the hardware resource with the highest capability, and storing the first rule in the identified resource.

2. The method of claim 1, wherein the varying levels of capability of the plurality of resources are packet identification capabilities.

3. The method of claim 1, further comprising:
   determining whether any rules stored in at least one resource of the plurality of hardware resources are unnecessary; and
   removing unnecessary rules from the at least one resource.

4. The method of claim 3, wherein a rule is determined to be unnecessary if it is a subset of another rule and has a lower priority than that other rule.

5. The method of claim 1, wherein the each flow rule includes an action, and the step of processing the first rule includes checking which resources can support the action.

6. The method of claim 5, wherein the resources are checked in order of increasing capability.

7. The method of claim 1, wherein the step of determining whether the first rule conflicts with any lower priority rules stored in the resource with the highest capability includes determining whether a packet could match both the first rule and at least one of the lower priority rules.

8. The method of claim 1, further comprising:
   determining whether the first rule conflicts with any other lower priority rules implemented on the router; and
   decreasing the priority of the first rule if the first rule does not conflict with any other lower priority rules implemented on the router.

9. The method of claim 1, further comprising:
   determining whether the first rule conflicts with any other higher priority rules implemented on the router; and
   increasing the priority of the first rule if the first rule does not conflict with any other higher priority rules implemented on the router.

10. A method for managing flow of packets, comprising:
    adding a flow rule to a router having a plurality of hardware resources storing flow rules of various priorities, the plurality of hardware resources having varying levels of capability relative to each other;
    processing the added rule to identify a lowest capability hardware resource in which the added rule can be stored;
    storing the added rule in the identified resource; and
    if the added rule is stored in a highest capability resource, moving any higher priority rules from a lower capability resource into the highest capability resource if such higher priority rules overlap with the added rule.

11. The method of claim 10, wherein the step of processing the added rule to identify the lowest capability hardware resource in which the added rule can be stored includes determining for at least one resource whether the added rule can be supported by a lower capability resource.

12. The method of claim 10, wherein the step of processing the added rule to identify the lowest capability hardware resource in which the added rule can be stored includes determining for at least one resource whether the added rule overlaps with any rules of lower priority stored in that resource.

13. The method of claim 10, further comprising determining whether the added rule is a subset of another higher priority rule on the router, and adding the rule to a deprecated rule set if it is a subset of another higher priority rule on the router.

14. The method of claim 10, further comprising:
determining whether any rules stored in the highest capability resource are redundant; and
removing any redundant rules.

15. A method for managing flow of packets, comprising:
selecting a flow rule for deletion from a router having a plurality of hardware resources storing flow rules of various priorities, the plurality of hardware resources having varying levels of capability relative to each other;
identifying the hardware resource in which the selected rule is stored;
removing the selected rule from the identified hardware resource; and
if the selected rule is removed from a highest capability resource, moving additional rules from the highest capability resource to a lower capability resource if such rules can be supported by the lower capability resource and do not conflict with any rules of the same priority in the lower capability resource.

16. The method of claim 15, further comprising maintaining a set of rules removed from the hardware resources.

17. The method of claim 16, further comprising comparing rules from the set of removed rules to the selected rule; and
restoring any rules from the set of removed rules if they are a lower priority subset of the selected rule.

18. A system for managing flow of packets in a router, comprising:
an input capable of receiving packet flow rules of various priorities;
a plurality of hardware resources having varying levels of capability relative to each other;
a processor programmed to implement flow rules received at the input into the plurality of hardware resources by:
selecting a first rule having a lowest priority;
determining whether the first rule conflicts with any lower priority rules stored in the resource with a highest capability;
storing the first rule in the resource with the highest capability if the first rule conflicts with a lower priority rule in the resource with the highest capability; and
processing the first rule to identify the hardware resource with the lowest capability that can support the first rule if the first rule does not conflict with a lower priority rule in the resource with the highest capability, and storing the first rule in the identified resource.

19. The system of claim 18, wherein the hardware resources include at least one of a MAC table, an MPLS table, and LPM table and an ACL table.

20. The system of claim 19, wherein the ACL table is the highest capability resource.

21. The system of claim 18, wherein the varying levels of capability of the plurality of resources are packet identification capabilities.

* * * * *